United States Patent [19]
Matsumoto

[11] 3,934,714
[45] Jan. 27, 1976

[54] METHOD AND APPARATUS FOR REGULATING ORIENTATION OF CONTAINERS OR THE LIKE

[75] Inventor: Takao Matsumoto, Amagasaki, Japan

[73] Assignee: Yamamura Glass Kabushiki Kaisha, Japan

[22] Filed: May 9, 1974

[21] Appl. No.: 468,520

[52] U.S. Cl............................. 198/244; 198/258
[51] Int. Cl.² ....................................... B65G 47/24
[58] Field of Search ........... 198/239, 244, 258, 261, 198/262, 210, 257, 259, 260, 376

[56] References Cited
UNITED STATES PATENTS
| | | | |
|---|---|---|---|
| 2,915,166 | 12/1959 | Grover | 198/262 |
| 3,245,196 | 4/1966 | DeShazor et al. | 198/244 |

Primary Examiner—Evon C. Blunk
Assistant Examiner—Douglas D. Watts
Attorney, Agent, or Firm—Holman & Stern

[57] ABSTRACT

The invention is an apparatus to automatically regulate the orientation of articles having a screw thread at their mouth during transport. The apparatus comprises: a turntable disposed at one side of a conveyor for transporting articles of a constant speed and rotatable in timed relation to the conveyor; a plurality of rotary tables supported by the turntable in circumferentially equidistant arrangement and each rotatable about its axis, the rotary tables being adapted to receive the articles from the conveyor onto the rotary tables; detecting elements disposed above the rotary tables and identical in number to the number of the rotary tables, the detecting elements being adapted to revolve at a speed equal to that of the turntable, each of the detecting elements being engageable with the screw thread around the mouth portion of the article; means for operating the detecting elements to bring each of the detecting elements into elastic engagement with the screw thread around the mouth portion of the article when the article is placed on the rotary table and to disengage the element from the screw thread within a specified angle of rotation of the turntable; drive means for driving the rotary table to rotate the article about its axis upon detecting the engagement of the detecting element with the screw thread; means for stopping the rotation of the rotary table at the position where the detecting element has detected the end of the screw thread as the article rotates; and means for delivering the articles from the rotary tables onto the conveyor at a specified angle of rotation.

2 Claims, 5 Drawing Figures

METHOD AND APPARATUS FOR REGULATING ORIENTATION OF CONTAINERS OR THE LIKE

BACKGROUND OF THE INVENTION

The present invention relates to an apparatus for regulating the orientation of containers, such as glass bottles or like articles, during transport; more particularly to a method and an apparatus by which articles such as glass bottles of a square, polygonal or elliptical cross section are regulated to a specified orientation and then sent out by mechanically detecting, during the transport of the articles, the end of a screw thread formed at a definite position of the mouth of each article, the thread end thus serving as a mark for the detecting operation.

Such glass bottles or like containers each bear a printing, label, pattern or different patterns on its surface or on several planar surfaces thereof. When wrapping or packaging these articles automatically, it is desired to regulate them to a specified orientation and thereafter feed them to a wrapping or packaging apparatus. Generally, however, the articles are conveyed in random orientations, and there is a need to manually regulate the orientation of the articles on a conveyor for the subsequent wrapping or packaging operation. Thus the manual procedure is a bottleneck in effecting a full-automatic wrapping or packaging operation.

The glass bottles or like containers are formed around their mouth portions with a screw thread for screwing the caps thereon. Since the screw thread is formed integrally with the glass bottle when it is molded, the ends of screw threads on bottles of the same kind are positioned approximately at a definite position even if they are made in different lots.

SUMMARY OF THE INVENTION

An object of this invention is to automatically regulate containers such as the above-mentioned glass bottles or like articles to a specified orientation and then send them out by mechanically detecting the end of the aforementioned screw thread or like marking on the article.

Another object of this invention is to provide means for automatically controlling the orientation of the articles during transport on a conveyor.

Still another object of this invention is to assure savings of labor for automatic wrapping or packaging operations by automatically regulating the orientation of the articles in the course of transport on a conveyor.

The present invention provides a method comprising the steps of engaging a detecting element with a screw thread around the mouth portion of an article during transport, the detecting element moving at a speed equal to that of transport of the article, rotating the article about its axis as engaged by the detecting element to detect the position of the end of the screw thread, and stopping the rotation of the article at the position where the end has been detected to thereby regulate the orientation of the article.

The apparatus for automatically practicing this method comprises: a turntable disposed at one side of a conveyor for transporting articles at a constant speed and rotatable in timed relation to the conveyor; a plurality of rotary tables supported by the turntable in circumferentially equidistant arrangement and each rotatable about its axis, the rotary tables being adapted to receive the articles from the conveyor and to rotate the received articles each about its axis; transfer means for transferring the articles from the conveyor onto the rotary tables; detecting elements disposed above the rotary tables and identical in number to the number of the rotary tables, the detecting elements being adapted to revolve at a speed equal to that of the turntable, each of the detecting elements being engageable with the screw thread around the mouth portion of the article; means for operating the detecting elements to bring each of the detecting elements into elastic engagement with the screw thread around the mouth portion of the article when the article is placed on the rotary table and to disengage the element from the screw thread within a specified angle of rotation of the turntable; drive means for driving the rotary table to rotate the article about its axis upon detecting the engagement of the detecting element with the screw thread; means for stopping the rotation of the rotary table at the position where the detecting element has detected the end of the screw thread as the article rotates; and means for delivering the articles from the rotary tables onto the conveyor at a specified angle of rotation of the turntable.

According to this invention, therefore, articles having a polygonal or elliptical cross section are conveyed as regulated to a specified orientation by fully-automatically detecting the end of the screw thread on the mouth portion of each article, whereby savings of labor are achieved, for example, in an automatic wrapping or packaging operation. Inasmuch as the apparatus is designed to be installed at one side of a conveyor for transporting the articles, the apparatus is employable easily in combination with a conveyor system of any type.

Other objects and features of this invention will become more apparent from the following description of the preferred embodiment thereof.

DESCRIPTION OF THE PREFERRED EMBODIMENT

Figure 1:
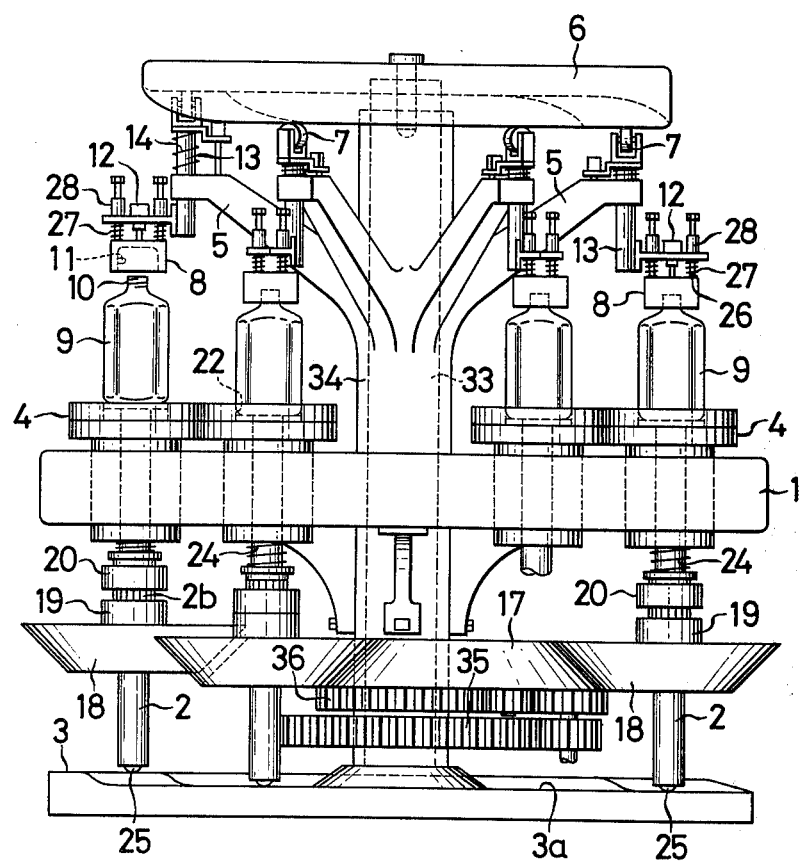
FIG. 1 is a front view of an embodiment of this invention.

With reference to the drawings, a turntable 1 fixed to a cylindrical shaft 34 is disposed at one side of a conveyor belt 31 driven at a constant speed and is rotated at a constant speed by drive means 35 in timed relation to the belt 31.

A number of rotary tables 4 are supported on the turntable 1 at circumferentially equal spacing. Each of the rotary tables 4 is rotatable about its own axis. The speed of rotation of the turntable 1 is fixed so that the peripheral speed of revolution of the rotary tables 4 is substantially equal to the speed of travel of the belt 31. Articles 9, such as glass bottles conveyed on the conveyor belt 31, are transferred onto the rotary tables 4 by arms 30a of a star wheel 30 serving as transfer means. Accordingly, the speed of rotation of the star wheel 30 is in timed relation to the speed of travel of the belt 31, such that the peripheral speed of the wheel 30 coincides with the belt speed. In place of the star wheel 30, hydraulically operable means (not shown), such as a hydraulic cylinder, are alternatively employable by which the articles 9 will be pushed from the far side of the conveyor belt 31 and thereby transferred onto the rotary tables 4.

Figure 3:
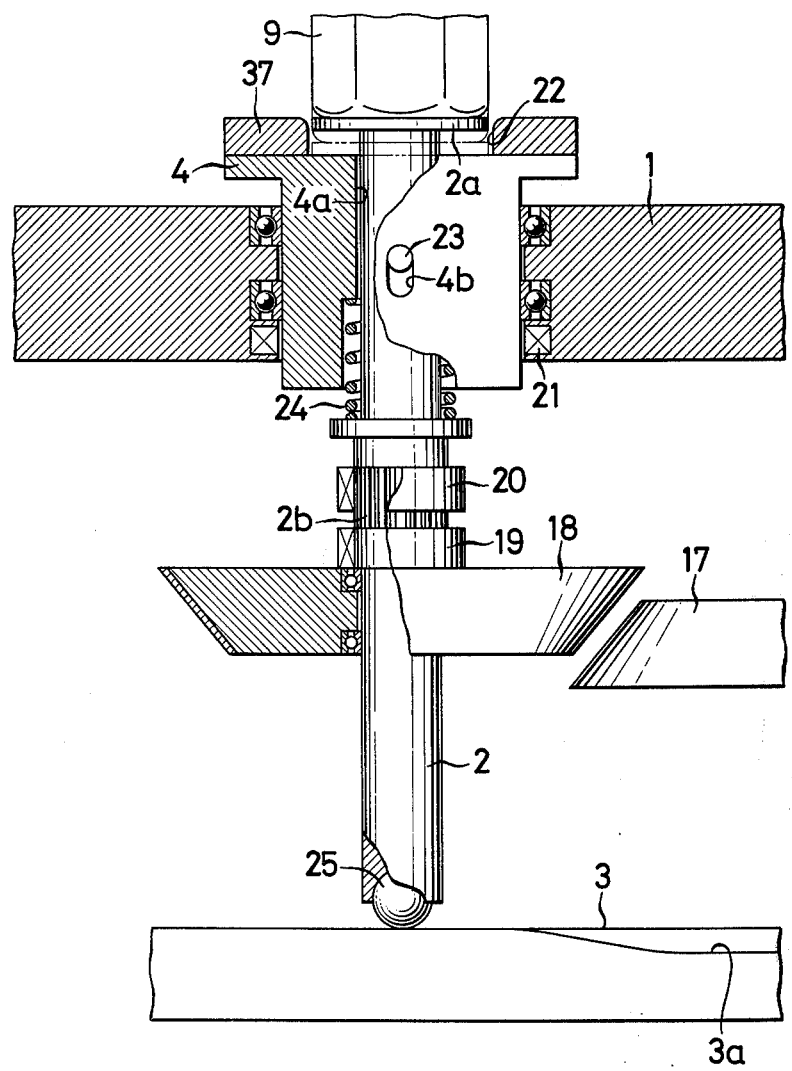
FIG. 3 is a front view partly broken away to show means for rotating a rotary table.

As shown in detail in FIG. 3, the rotary table 4 carries thereon an attachment 37 having a hole 22 in conformity with the shape of the bottom of the article 9. The attachment 37 is replaceable as desired in accordance with the shape of the article 9.

The rotary table 4 has a hole 4a through which extends a shaft 2 having a pin 23 thereon. The table 4 is rotatable with the shaft 2 by virtue of the engagement of the pin 23 in a vertically elongated hole 4b. The shaft 2 has a head portion 2a which is movable upward from and downward to the bottom of hole 22 of the attachment 37. Interposed between the shaft 2 and the rotary table 4 is a spring 24 biasing the shaft 2 downward.

The shaft 2 has a steel ball 25 rollably attached to its lower end. The steel ball 25 is pressed against a stationary plate cam 3 by the action of the spring 24. During the revolution of the rotary table 4, the shaft 2 is movable up and down, following the configuration of the upper surface of the plate cam 3 to permit the head portion 2a of the shaft 2 to move up and down within the hole 22. More specifically with reference to FIG. 2, the shaft 2 shifts upward to render its top surface substantially flush with the top surface of the attachment 37, as indicated in the solid line in FIG. 3, when the article 9 is transferred from the belt conveyor 31 onto the rotary table 4 and also when the article 9 is delivered from the rotary table 4 onto the conveyor belt 31, as will be described later. During the detecting operation to be described later, the head portion 2a of the shaft 2 is retracted to the bottom of the hole 22, causing the bottom portion of the article 9 to fit in the hole 22 of the attachment 37 (as indicated in the phantom line in FIG. 3) and rendering the article 9 rotatable with the rotary table 4.

Figure 2:
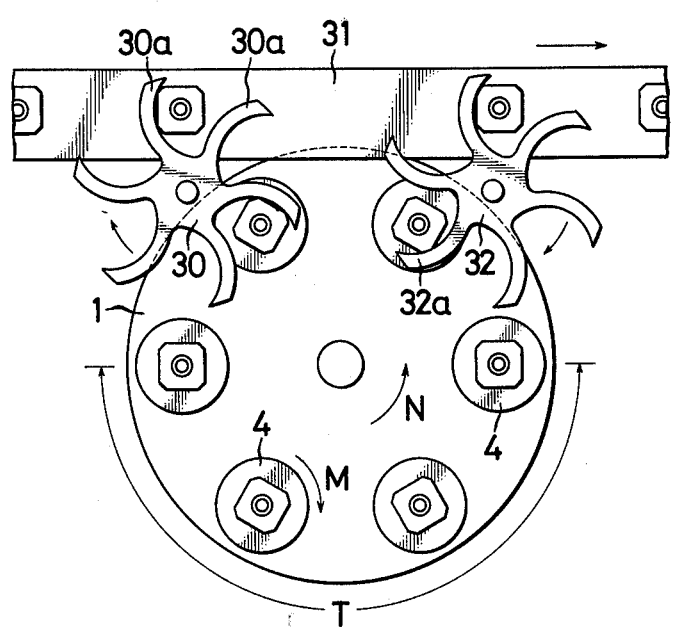
FIG. 2 is a plan view of the principal part of the same.

Means for rotating the rotary table 4 comprises: a friction wheel 17 supported by the cylindrical shaft 34 and rotatable by drive means 36, independently of the cylindrical shaft 34; another friction wheel 18 mounted on the shaft 2 and rotatable by the friction wheel 17 in frictional engagement therewith while the shaft 2 is moving on the low level portion 3a of the plate cam 3, namely while the head portion 2a of the shaft 2 is held retracted to the bottom 22 of the attachment 37; and electromagnetic clutch means 19 and 20 for causing the shaft 2 to rotate about its axis together with the friction wheel 18 in response to a detection initiating signal to be described later and for freeing the shaft 2 from the friction wheel 18 in response to a detection terminating signal. Furthermore, an electromagnetic brake 21 is provided around the rotary table 4 to brake and stop the rotary table 4 in response to the detection terminating signal. In FIG. 2 the turntable 1 rotates in the direction of an arrow N and the rotary table 4 therefore revolves with it in the same direction, whereas within the orientation detecting area T shown, the rotary table 4 is rotatable about its axis in the opposite direction, indicated by an arrow M. During the revolution of the table 4 within the detecting area T, the rotary table 4 is brought to a halt in response to the detection terminating signal. The slider 20 of the electromagnetic clutch means 19 and 20 is slidably fitted around a splined portion 2b of the shaft 2 to perform a clutch action as already known.

The cylindrical shaft 34 is provided with arms 5 extending to above the rotary tables 4 and identical in number to the number of the rotary tables 4. Each of the arms 5 carries at its distal end a bracket post 13 that is vertically movable. A spring 14 biases the post 13 upward, keeping a roller 7 at its upper end in rolling contact with the cam surface of a control plate cam 6 secured to the upper end of a main pole 33 which extends through the cylindrical shaft 34. The rotation of the cylindrical shaft 34 with respect to control plate cam 6 moves the bracket posts 13 up and down, accordingly. Between the bracket post 13 and the arm 5, there is disposed a detection initiating microswitch 16 by means of a mounting member 15. When the bracket post 13, which is movable up and down by contact with the control plate cam 6, is lowered at the detection initiating point of the orientation detecting area T shown in FIG. 2, the microswitch 16 emits a rotation initiating signal for the rotary table 4 to energize the electromagnetic clutch means 19 and 20, whereby the torque of the friction wheel 18 driven by the friction wheel 17 is delivered by way of the shaft 2 to the rotary table 4, which is in turn rotated about its axis as already described.

Fixed mounted on the lower end of the bracket post 13 is a bracket 29 having tubular portions 28 carrying head supporting members 26 in a vertically movable manner. To the lower ends of the supporting members 26 is fixed a caplike detecting head 8 which is biased downward by springs 27. A detecting element 11 projects into the inner cavity of the head 8. A microswitch 12 for emitting a detection terminating signal is provided between the bracket 29 and the detecting head 8.

Figure 4:
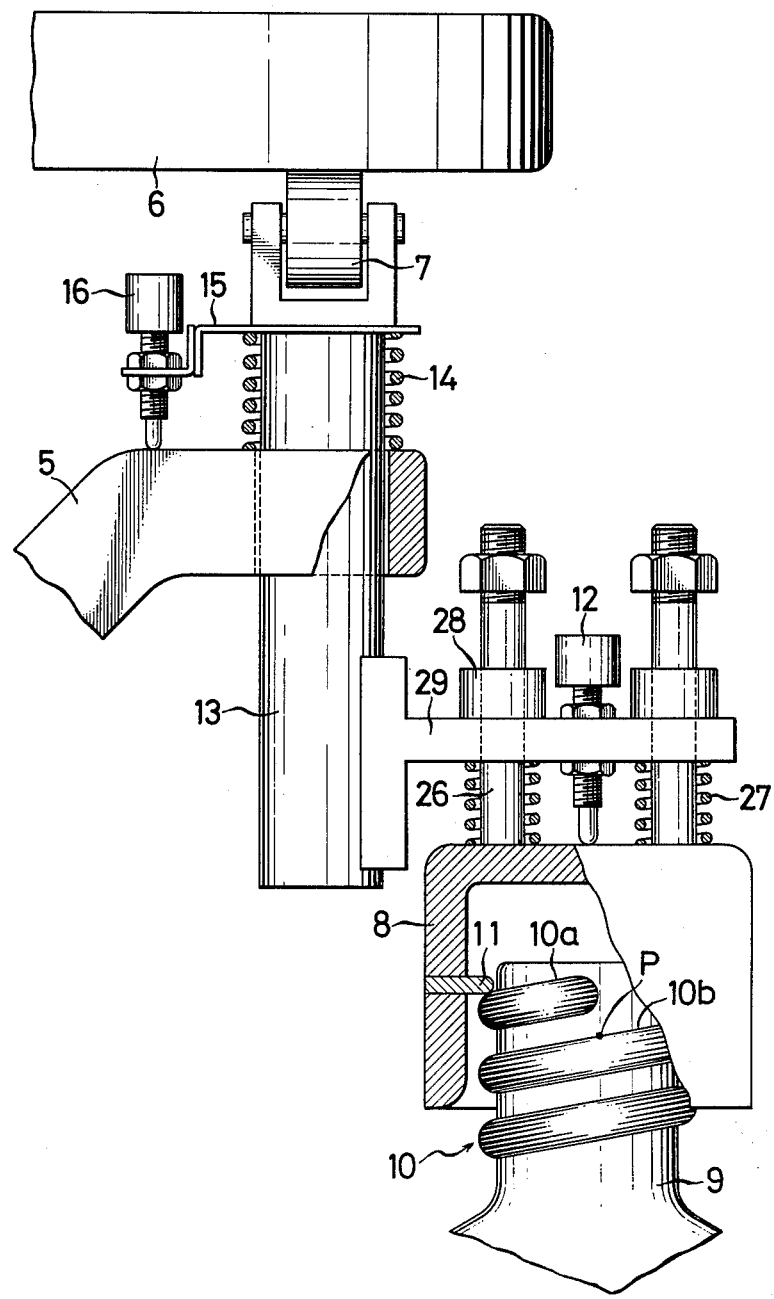
FIG. 4 is a front view partly broken away to show an orientation detecting means.

The downward movement of the bracket post 13 fits the detecting head 8 over the mouth of the article 9 as seen in FIG. 4. The springs 27 act to keep the detecting element 11 in elastic contact with a screw thread 10 on the mouth. When the article 9 is rotated by the rotary table 4, the detecting element 11 is pushed upward along the screw head 10 and then released from the thread 10 at its end 10a, whereupon the springs 27 forces the detecting element 11 down into contact with the lower screw thread 10b at a point P. Thus the microswitch 12 acting on the detecting head 8 detects the end of the screw thread 10 and emits a detection terminating signal at that position, deenergizing the electromagnetic clutch means 19 and 20 to stop the rotation of the shaft 2 and actuating the electromagnetic brake 21 to stop the rotation of the rotary table 4. In this way, the detection of the end of the screw thread 10 stops the rotation of the article 9. The articles of the same kind are therefore stopped all at the same position.

The detecting element 11 may possibly reach the point P in FIG. 4 directly upon the downward movement of the bracket post 13. To accurately control the orientation of the article in such case, the apparatus may be so adapted as to cause the article 9 to make one turn of rotation from that position and to thereby permit the detecting element 11 to move down again to the point P from the end 10a of the screw thread 10, whereupon the terminating signal will be emitted. This can be achieved, for example, by incorporating delaying means in an unillustrated electric circuit.

When the article 9, stopped from rotation upon completion of the detecting operation, is brought close to the conveyor 31 as the turntable 1 further rotates, an arm 32a of a star wheel 32 serving as delivering means pushes out the article 9 from the rotary table 4 onto the conveyor belt 1. The means for rotating the star wheel 32 may be the same as one for the star wheel 30 for the transfer operation already described.

In this way, the shaft 2 and bracket post 13 are moved up and down in timed relation to each other as determined by the cam plates 3 and 6, i.e. with specified timing, while the rotary table 4 rotates and stops under the control of the microswitches 16 and 12 coupled to the bracket post 13 and detecting head 8, whereby the orientation of the article is automatically determined and it is thereafter sent out onto the conveyor.

The construction of the detecting head 8 is not limited to one in the foregoing embodiment. For example, a split nut is brought close to the mouth of the article 9 on the opposite sides thereof and the nut is fastened from the opposite sides, the construction being such that when the female screw thread in the internal hole of the nut intimately fits with the screw thread on the mouth as the article rotates about its axis, the position will be detected to stop the rotation of the rotary table to control the orientation of the article.

Figure 5:
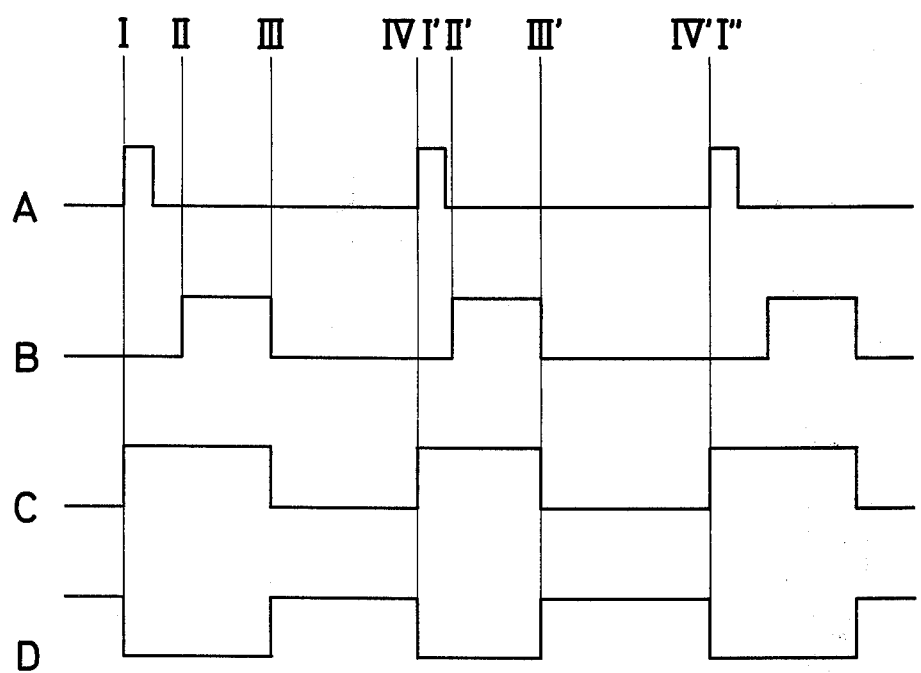
FIG. 5 is a time chart of operation.

FIG. 5 shows the time chart of the operation of the embodiment described, in which indicated at A is the actuating signal from the microswitch 16 to initiate the rotary table 4 into rotation, at B the actuating signal from the microswitch 12 for stopping the rotation of the rotary table 4, at C the actuating signal for the electromagnetic clutch means 19 and 20, at D the actuating signal for the brake 21. At section I, the rotary table 4 is brought into rotation about its axis, at section II the detecting element 11 comes into contact with the screw thread 10 to initiate the orientation detecting operation, which is terminated at section III, whereupon the rotary table 4 is prevented from rotation. One cycle is completed at section IV. Repetition of the detecting operation follows as indicated at I', II'... I''.

What is claimed is:

1. An apparatus for regulating the orientation of containers or like articles, each formed with a screw thread around its mouth portion, during transport comprising:
   a turntable disposed at one side of a conveyor for transporting the articles at a constant speed and rotatable in timed relation to the conveyor;
   a plurality of rotary tables supported by the turntable in circumferentially equidistant arrangement and each rotatable about its axis, the rotary tables being adapted to receive the articles from the conveyor and to rotate the received articles each about its axis;
   transfer means for transferring the articles from the conveyor onto the rotary tables, one by one;
   detecting means disposed above the rotary tables and identical in number to the number of the rotary tables, the detecting means capable of sending signals to a drive means being adapted to revolve at a speed equal to that of the turntable, each of the detecting means being engageable with the screw thread around the mouth portion of the article;
   means for operating the detecting means to bring each of the detecting means into elastic pushing engagement with the screw thread around the mouth portion of the article within a specified range of angle of revolution of the detecting means and to disengage the detecting means from the screw thread outside the range;
   drive means for rotating the rotary table about its axis in response to a signal detecting the engagement of the detecting means with the screw thread and for stopping the rotation of the rotary table in response to a signal detecting that the engagement has changed as the rotary table rotates; and
   delivering means for delivering the articles from the rotary tables onto the conveyor after the articles have been positioned in a specified orientation upon completion of the detecting operation.

2. An apparatus for regulating the orientation of containers or like articles, each formed with a screw thread around its mouth portion, during transport comprising:
   a turntable disposed at one side of a conveyor for transporting the articles at a constant speed and rotatable in timed relation to the conveyor;
   a plurality of rotary tables supported by the turntable in circumferentially equidistant arrangement and each rotatable about its axis, the rotary tables being adapted to receive the articles from the conveyor and to rotate the received articles each about its axis;
   transfer means for transferring the articles from the conveyor onto the rotary tables, one by one;
   detecting elements disposed above the rotary tables and identical in number to the number of the rotary tables, the detecting elements being adapted to revolve at a speed equal to that of the turntable, each of the detecting elements being engageable with the screw thread around the mouth portion of the article;
   means for operating the detecting elements to bring each of the detecting elements into elastic pushing engagement with the screw thread around the mouth portion of the article within a specified range of angle of revolution of the detecting element and to disengage the detecting element from the screw thread outside the range, said means for operating the detecting element includes
   support members downwardly biasing and supporting the detecting elements, arms biasing the support members upward and rotatable with the turntable, cams for moving the support members up and down at specified angles of rotation of the turntable, means for detecting the engagement of each of the detecting elements with the screw thread around the mouth of the article to emit a detecting signal, and means for detecting a change in the engagement of the detecting element with the screw thread during the rotation of the article to emit a detecting signal;
   drive means for rotating the rotary table about its axis in response to a detection signal detecting the engagement of the detecting element with the screw thread and for stopping the rotation of the rotary table in response to a detection signal detecting that the engagement has changed as the rotary table rotates; and
   delivering means for delivering the articles from the rotary table onto the conveyor after the articles have been positioned in a specified orientation upon completion of the detecting operation.

* * * * *